United States Patent
Basu (10) Patent No.: US 10,824,502 B2
(45) Date of Patent: Nov. 3, 2020

(54) ENHANCED CODEWORD FOR MEDIA PERSISTENCE AND DIAGNOSTICS

(71) Applicant: Micron Technology, Inc., Boise, ID (US)

(72) Inventor: Reshmi Basu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 177 days.

(21) Appl. No.: 16/058,813

(22) Filed: Aug. 8, 2018

(65) Prior Publication Data
US 2020/0050512 A1 Feb. 13, 2020

(51) Int. Cl.
G06F 11/10 (2006.01)
G06F 12/02 (2006.01)
G06F 3/06 (2006.01)
G06F 12/06 (2006.01)

(52) U.S. Cl.
CPC ........ G06F 11/1048 (2013.01); G06F 3/0619 (2013.01); G06F 3/0631 (2013.01); G06F 3/0683 (2013.01); G06F 12/0246 (2013.01); G06F 12/0646 (2013.01)

(58) Field of Classification Search
CPC .................................................. G06F 11/1048
USPC ........................................................ 714/6.1
See application file for complete search history.

(56) References Cited

U.S. PATENT DOCUMENTS

| | | | |
|---|---|---|---|
| 9,323,765 B1 | 4/2016 | Stefanov et al. | |
| 10,002,086 B1 * | 6/2018 | Achtenberg | ........ G06F 11/1048 |
| 2013/0117606 A1 | 5/2013 | Anholt et al. | |
| 2013/0124804 A1 | 5/2013 | Suzuki et al. | |
| 2013/0246891 A1 * | 9/2013 | Manning | ................ G11C 29/52 714/773 |
| 2014/0245097 A1 * | 8/2014 | Larsen | ............. H03M 13/2906 714/755 |
| 2015/0006998 A1 * | 1/2015 | Cordero | ................ G06F 11/106 714/773 |
| 2015/0113203 A1 * | 4/2015 | Dancho | ................. G06F 3/0679 711/102 |

(Continued)

OTHER PUBLICATIONS

Kim et al; "Resilient Memory Architectures: A very short tutorial on ECC and Repair;" University of Texas, HPCA 2016 (84 pages).

(Continued)

*Primary Examiner* — Chae M Ko
(74) *Attorney, Agent, or Firm* — Fletcher Yoder, P.C.

(57) ABSTRACT

Methods, apparatuses, and systems for error recovery in memory devices are described. A die-level redundancy scheme may be employed in which parity data associated with particular die may be stored. An example apparatus may include a printed circuit board and memory devices. Each memory device may be each disposed on a planar surface of the printed circuit board and may each include two or more memory die. The apparatus may also include multiple channels communicatively coupled to the two or more memory die and a memory controller. The memory controller may be communicatively coupled to the multiple channels and may deterministically maintain a redundancy scheme via data transmission through the multiple channels. The memory controller may also update memory operation information appended to the enhanced codeword in response to a memory operation request.

20 Claims, 6 Drawing Sheets

(56) References Cited

U.S. PATENT DOCUMENTS

2016/0042809 A1   2/2016  Kim et al.
2016/0357632 A1*  12/2016 d'Abreu .............. G06F 11/1072
2016/0371144 A1   12/2016 Fillingim et al.
2018/0004601 A1*  1/2018  Lee .................... G06F 11/1076
2018/0358989 A1*  12/2018 Mehra ............... H03M 13/2927
2019/0121696 A1*  4/2019  Chen .................. G06F 12/0246

OTHER PUBLICATIONS

U.S. Appl. No. 15/908,167, filed Feb. 28, 2018, Richard C. Murphy.
U.S. Appl. No. 15/908,184, filed Feb. 28, 2018, Richard C. Murphy.
International Search Report and Written Opinion issued in corresponding Application No. PCT/US2019/040934, dated Oct. 25, 2019 (13 pages).

* cited by examiner

ENHANCED CODEWORD FOR MEDIA PERSISTENCE AND DIAGNOSTICS

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

Generally, a computing system includes processing circuitry, such as one or more processors or other suitable components, and memory devices, such as chips or integrated circuits. One or more memory devices may be implemented on a memory module, such as a dual in-line memory module (DIMM), to store data accessible to the processing circuitry. For example, based on a user input to the computing system, the processing circuitry may request that a memory module retrieve data corresponding to the user input from its memory devices. In some instances, the retrieved data may include instructions executable by the processing circuitry to perform an operation and/or may include data to be used as an input for the operation. In addition, in some cases, data output from the operation may be stored in memory, for example, to enable subsequent retrieval.

Furthermore, the data stored in the memory devices may include particular data that is desired to be preserved, retained, or recreated in the case of data loss or memory device malfunction. Resources dedicated to storing such data may be unavailable for other uses and may thus constrain device operability.

BRIEF DESCRIPTION OF THE DRAWINGS

Various aspects of this disclosure may be better understood upon reading the following detailed description and upon reference to the drawings in which.

DETAILED DESCRIPTION

As memory is read or written to material properties of the memory degrade and/or age over time. Thus, information regarding these memory operations may be useful to monitor memory health and perform predictive diagnostics on memory systems. However, in many cases, tracking the memory operation information is not simple and uses additional channels to support information transmission. In addition, preserving the memory operation information may use an increased amount of back-up circuitry to protect against data loss, such as protective capacitors that aide data back-up in the event of an asynchronous power loss event.

Generally, hardware of a computing system includes processing circuitry and memory, for example, implemented using one or more processors and/or one or more memory devices (e.g., chips or integrated circuits). During operation of the computing system, the processing circuitry may perform various operations (e.g., tasks) by executing corresponding instructions, for example, based on a user input to determine output data by performing operations on input data. To facilitate operation of the computing system, data accessible to the processing circuitry may be stored in a memory device, such that the memory device stores the input data, the output data, data indicating the executable instructions, or any combination thereof.

In some instances, multiple memory devices may be implemented on a memory module, thereby enabling the memory devices to be communicatively coupled to the processing circuitry as a unit. For example, a dual in-line memory module (DIMM) may include a printed circuit board (PCB) and multiple memory devices. Memory modules respond to commands from a memory controller communicatively coupled to a client device or a host device via a communication network. Or in some cases, a memory controller may be implemented on the host-side of a memory-host interface; for example, a processor, microcontroller, or ASIC may include a memory controller. This communication network may enable data communication between the client devices and the memory module to utilize hardware resources accessible via communication with the memory controller. Based at least in part on user input to the client device, processing circuitry of the memory controller may perform one or more memory operations to facilitate the retrieval or transmission of data between the client device and the memory devices. Data communicated between the client device and the memory devices may be used for a variety of purposes including, but not limited to, presentation of a visualization to a user through a graphical user interface (GUI) at the client device, processing operations, calculations, or the like.

Additionally, in some instances, memory devices may be implemented using different memory types. For example, a memory device may be implemented as volatile memory, such as dynamic random-access memory (DRAM) or static random-access memory (SRAM). Alternatively, the memory device may be implemented as non-volatile memory, such as flash (e.g., NAND) memory, phase-change memory (e.g., 3D XPoint™), or ferroelectric random access memory (Fe-RAM). In any case, memory devices generally include at least one memory die (i.e., an array of memory cells configured on a portion or "die" of a semiconductor wafer) to store data bits (e.g., "0" bit or "1" bit) transmitted to the memory device through a channel (e.g., data channel, communicative coupling) and may be functionally similar from the perspective of the processing circuitry even when implemented using different memory types.

Through memory operations, a memory module may use or access different memory devices more frequently, or at a higher rate, than other memory devices within the same memory module. This may lead to non-uniform aging and/or degradation of the memory devices. In some circumstances, these different access attempts may be tracked and information regarding the number of access attempts may be leveraged to monitor an age or health of the memory devices. For example, memory operation information regarding access counts, time last accessed, whether the memory device is free or defective (e.g., dead, faulty), information regarding the translation from logical addresses to physical addresses, or the like, may be stored and tracked for each memory device to facilitate in monitoring memory device health and to facilitate performance of memory operations.

This memory operation information may be stored in a data table or otherwise suitable store of data maintained by a memory controller of the memory module. The memory controller may update the stored memory operation information each time a memory device is accessed. Thus, to access the stored memory operation information, an additional channel may be used to transmit some or all of the memory operation information to a host device for further analysis or use. This additional channel may be included in addition to the channels used to access the memory devices during memory operations.

The memory operation information may include information to maintain in the event of data loss, memory malfunction, power loss, or the like. For example, memory operation information may include logical-to-physical data (e.g., data indicative of logical address to physical address translation), or data defining the physical address corresponding to various memories. If the logical-to-physical data is lost during a data loss event, the memory module may be rendered useless because the memory controller may lose its ability to translate memory access requests from a host device (e.g., the memory controller may not know where data is actually stored). Thus, in addition to data redundancy schemes used to back-up the data stored in the various memory devices, a memory system may provide back-up or redundancy to the memory operation information to protect against data loss, for example, caused by an asynchronous power loss event.

Commonly, redundancy schemes operate to protect an entire codeword (e.g., data chunk, segment of data) stored in a memory die of a memory device. A codeword may be stored in a memory die but the memory die may be of any size memory as long as it is of sufficient size to store the codeword. In these memory systems, the codeword may be used in an XOR operation to generate parity data that is based on each memory die to be backed-up. In the event of data loss, this parity data may be used to recover the codeword of the memory die that was compromised or destroyed in the data loss event, and thus may be said to include an indication of values stored within each codeword of the backed-up memory die. Since a memory module may implement a redundancy scheme that backs up data transmitted as part of a codeword, there may be particular advantages to appending the memory operation information with the codeword and updating the memory operation information stored on the memory die within the codeword each time the codeword is written to the memory die. In this way, the memory operation information may be backed-up each time the memory module operates to back-up codewords stored on memory die.

To facilitate improving the storing and transmitting of memory operation information, the present disclosure provides techniques for implementing and operating memory modules to include the memory operation information as a part of the codeword. By integrating the memory operation information into the codeword stored on each memory die, the memory operation information is readily backed-up each time codewords are backed-up via the redundancy scheme. For example, a memory module implementing a die-level redundant array of independent 3D XPoint™ memory (RAIX) redundancy scheme may back-up codewords at each point during memory operation that data stored in the memory die changes, such as after each write event (e.g., write event from writing new data to a memory die, write event as a part of a memory scrubbing operation to refresh the data in the memory die). For ease of discussion, this disclosure focuses on enhancing codewords used in a memory module implementing a die-level RAIX scheme to include a data payload in addition to the memory operation information, but it should be understood that a variety of applications and embodiments may use a codeword enhanced with memory operation information to facilitate with monitoring and managing of the memory module.

In addition, certain computing processes may be separated from each other to improve operational efficiency of the computing system. For example, beyond merely controlling data access (e.g., storage and/or retrieval), the memory processing circuitry may be implemented to perform data processing operations, for example, which would otherwise be performed by host processing circuitry. For ease of description, die-level RAIX is described below as implemented in a computing system using these remote computing devices, however, it should be understood that a variety of valid embodiments may implement die-level RAIX schemes. For example, a computing system that does not use remote computing devices and instead combines components of a client device with memory modules and processing circuitry of the remote computing devices may be employed.

Figure 1:
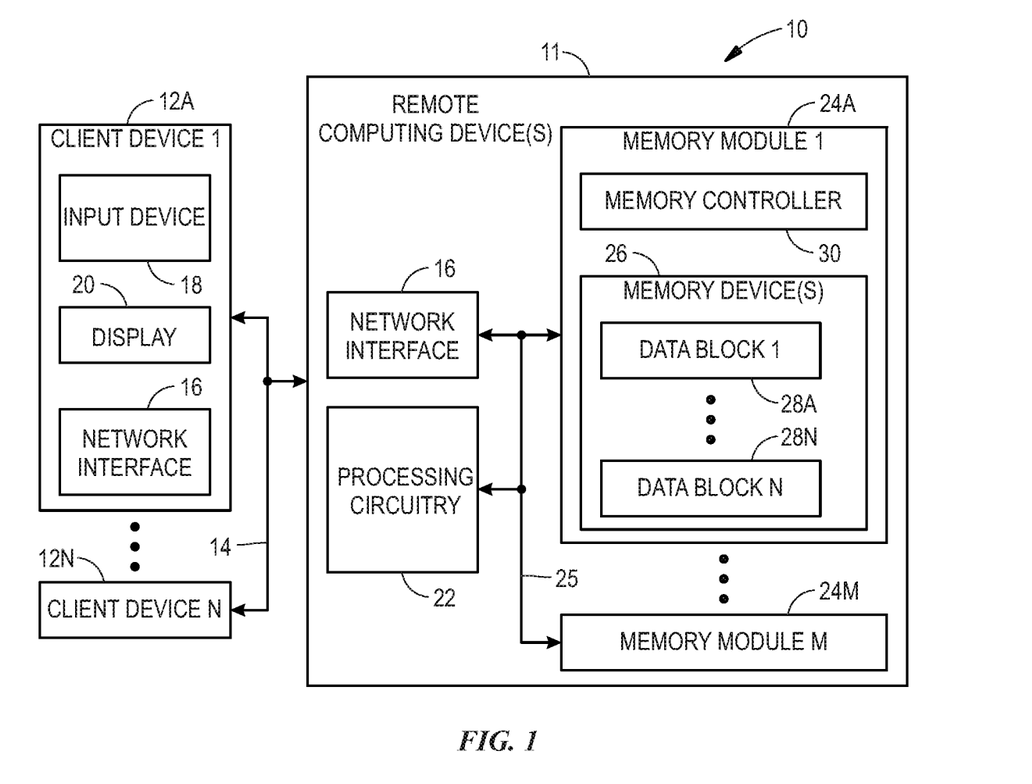
FIG. 1 is a block diagram of a computing system that includes client devices and one or more remote computing devices, in accordance with an embodiment.

To help illustrate, FIG. 1 depicts an example of a computing system 10, which includes one or more remote computing devices 11. As in the depicted embodiment, the remote computing devices 11 may be communicatively coupled to the one or more client devices 12 via a communication network 14. It should be appreciated that the depicted embodiment is merely intended to be illustrative and not limiting. For example, in other embodiments, the remote computing devices 11 may be communicatively coupled to a single client device 12 or more than two client devices 12.

In any case, the communication network 14 may enable data communication between the client devices 12 and the remote computing devices 11. In some embodiments, the client devices 12 may be physically remote (e.g., separate) from the remote computing devices 11, for example, such that the remote computing devices 11 are located at a centralized data center. Thus, in some embodiments, the communication network 14 may be a wide area network (WAN), such as the Internet. To facilitate communication via the communication network 14, the remote computing devices 11 and the client devices 12 may each include a network interface 16.

In addition to the network interface 16, a client device 12 may include input devices 18 and/or an electronic display 20 to enable a user to interact with the client device 12. For example, the input devices 18 may receive user inputs and, thus, may include buttons, keyboards, mice, trackpads, and/or the like. Additionally or alternatively, the electronic display 20 may include touch sensing components that receive user inputs by detecting occurrence and/or position of an object touching its screen (e.g., surface of the electronic display 20). In addition to enabling user inputs, the electronic display 20 may facilitate providing visual representations of information by displaying a graphical user interface (GUI) of an operating system, an application interface, text, a still image, video content, or the like.

As described above, the communication network 14 may enable data communication between the remote computing devices 11 and one or more client devices 12. In other words, the communication network 14 may enable user inputs to be communicated from a client device 12 to a remote computing device 11. Additionally or alternatively, the communication network 14 may enable results of operations performed by the remote computing device 11 based on the user inputs to be communicated back to the client device 12, for example, as image data to be displayed on its electronic display 20.

In fact, in some embodiments, data communication provided by the communication network 14 may be leveraged to make centralized hardware available to multiple users, such that hardware at client devices 12 may be reduced. For example, the remote computing devices 11 may provide data storage for multiple different client devices 12, thereby enabling data storage (e.g., memory) provided locally at the client devices 12 to be reduced. Additionally or alternatively, the remote computing devices 11 may provide processing for multiple different client devices 12, thereby enabling processing power provided locally at the client devices 12 to be reduced.

Thus, in addition to the network interface 16, the remote computing devices 11 may include processing circuitry 22 and one or more memory modules 24 (e.g., sub-systems) communicatively coupled via a data bus 25. In some embodiments, the processing circuitry 22 and/or the memory modules 24 may be implemented across multiple remote computing devices 11, for example, such that a first remote computing device 11 includes a portion of the processing circuitry 22 and the first memory module 24A, while an Mth remote computing device 11 includes another portion of the processing circuitry 22 and the Mth memory module 24M. Additionally or alternatively, the processing circuitry 22 and the memory modules 24 may be implemented in a single remote computing device 11.

In any case, the processing circuitry 22 may generally execute instructions to perform operations, for example, indicated by user inputs received from a client device 12. Thus, the processing circuitry 22 may include one or more central processing units (CPUs), one or more graphics processing units (GPUs), one or more processor cores, or any combination thereof. In some embodiments, the processing circuitry 22 may additionally perform operations based on circuit connections formed (e.g., programmed) in the processing circuitry 22. Thus, in such embodiments, the processing circuitry 22 may additionally include one or more application specific integrated circuits (ASICs), one or more field programmable logic arrays (FPGAs), or both.

Additionally, a memory module 24 may provide data storage accessible to the processing circuitry 22. For example, a memory module 24 may store data received from a client device 12, data resulting from an operation performed by the processing circuitry 22, data to be input to the operation performed by the processing circuitry 22, instructions executable by the processing circuitry 22 to perform the operation, or any combination thereof. To facilitate providing data storage, a memory module 24 may include one or more memory devices 26 (e.g., chips or integrated circuits). In other words, the memory devices 26 may each be a tangible, non-transitory, computer-readable medium that stores data accessible to the processing circuitry 22.

Since hardware of the remote computing devices 11 may be utilized by multiple client devices 12, at least in some instances, a memory module 24 may store data corresponding with different client devices 12. To facilitate identifying appropriate data, in some embodiments, the data may be grouped and stored as data blocks 28. In fact, in some embodiments, data corresponding with each client device 12 may be stored as a separate data block 28. For example, the memory devices 26 in the first memory module 24A may store a first data block 28A corresponding with the first client device 12A and an Nth data block 28N corresponding with the Nth client device 12N. One or more data blocks 28 may be stored within a memory die of the memory device 26.

Additionally, in some embodiments, a data block 28 may correspond to a virtual machine (VM) provided to a client device 12. In other words, as an illustrative example, a remote computing device 11 may provide the first client device 12A a first virtual machine via the first data block 28A and provide the Nth client device 12N an Nth virtual machine via the Nth data block 28N. Thus, when the first client device 12A receives user inputs intended for the first virtual machine, the first client device 12A may communicate the user inputs to the remote computing devices 11 via the communication network 14. Based at least in part on the user inputs, the remote computing device 11 may retrieve the first data block 28A, execute instructions to perform corresponding operations, and communicate the results of the operations back to the first client device 12A via the communication network 14.

Similarly, when the Nth client device 12N receives user inputs intended for the Nth virtual machine, the Nth client device 12N may communicate the user inputs to the remote computing devices 11 via the communication network 14. Based at least in part on the user inputs, the remote computing device 11 may retrieve the Nth data block 28N, execute instructions to perform corresponding operations, and communicate the results of the operations back to the Nth client device 12N via the communication network 14. Thus, the remote computing devices 11 may access (e.g., read and/or write) various data blocks 28 stored in a memory module 24.

To facilitate improving access to stored data blocks 28, a memory module 24 may include a memory controller 30 that controls storage of data in its memory devices 26. In some embodiments, the memory controller 30 may operate based on circuit connections formed (e.g., programmed) in the memory controller 30. Thus, in such embodiments, the memory controller 30 may include one or more application specific integrated circuits (ASICs), one or more field programmable logic gate arrays (FPGAs), or both. In any case, as described above, a memory module 24 may include memory devices 26 that implement different memory types, for example, which provide varying tradeoffs between data access speed and data storage density. Thus, in such embodiments, the memory controller 30 may control data storage across multiple memory devices 26 to facilitate leveraging the various tradeoffs, for example, such that the memory module 24 provides fast data access speed as well as high data storage capacity.

Figure 2:
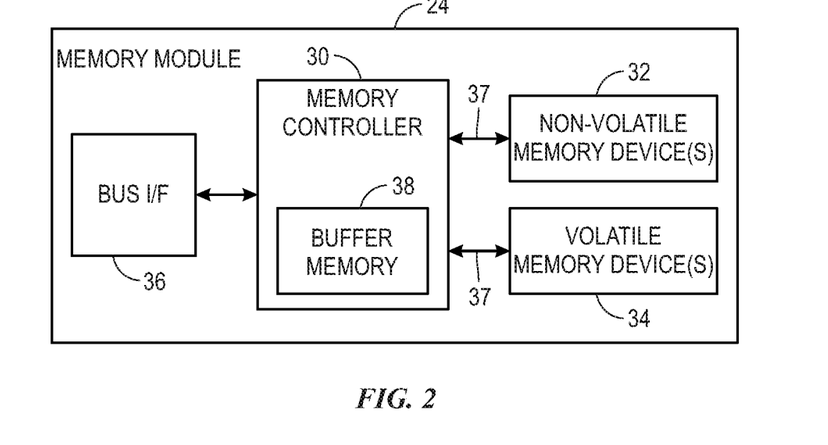
FIG. 2 is a block diagram of a memory module that may be implemented in a remote computing device of FIG. 1, in accordance with an embodiment.

To help illustrate, FIG. 2 depicts an example of a memory module 24 including different types of memory devices 26. In particular, the memory module 24 includes one or more non-volatile memory devices 32 and one or more volatile memory devices 34. In some embodiments, the volatile memory devices 34 may be implemented as dynamic random-access memory (DRAM) and/or static random-access memory (SRAM). In other words, in such embodiments, the memory module 24 may include one or more DRAM devices (e.g., chips or integrated circuits), one or more SRAM devices (e.g., chips or integrated circuits), or both.

Additionally, in some embodiments, the non-volatile memory devices 32 may be implemented as flash (e.g., NAND) memory, phase-change (e.g., 3D XPoint™) memory, and/or ferroelectric random access memory (FeRAM). In other words, in such embodiments, the memory module 24 may include one or more NAND memory devices, one or more 3D XPoint™ memory devices, or both. In fact, in some embodiments, the non-volatile memory devices 32 may provide storage class memory (SCM), which, at least in some instance, may facilitate reducing implementation associated cost, for example, by obviating other non-volatile data storage devices in the computing system 10.

In any case, in some embodiments, the memory module 24 may be implemented by disposing each of the non-volatile memory devices 32 and the volatile memory devices 34 on a flat (e.g., front and/or back, planar) surface of a printed circuit board (PCB). To facilitate data communication via the data bus 25, the memory module 24 may include a bus interface 36. For example, the bus interface 36 may include data pins (e.g., contacts) formed along an (e.g., bottom) edge of the printed circuit board. Thus, in some embodiments, the memory module 24 may be a single in-line memory module (SIMM), a dual in-line memory module (DIMM), or the like.

Additionally, in some embodiments, the bus interface 36 may include logic that enables the memory module 24 to communicate via a communication protocol implemented on the data bus 25. For example, the bus interface 36 may control timing of data output from the memory module 24 to the data bus 25 and/or interpret data input to the memory module 24 from the data bus 25 in accordance with the communication protocol. Thus, in some embodiments, the bus interface 36 may be a double data rate fourth-generation (DDR4) interface, a double data rate fifth-generation (DDR5) interface, a peripheral component interconnect express (PCIe) interface, a non-volatile dual in-line memory module (e.g., NVDIMM-P) interface, or the like.

In any case, as described above, a memory controller 30 may control data storage within the memory module 24, for example, to facilitate improving data access speed and/or data storage efficiency by leveraging the various tradeoffs provided by memory types implemented in the memory module 24. Thus, as in the depicted example, the memory controller 30 may be coupled between the bus interface 36 and the memory devices 26 via one or more internal buses 37 (e.g., channels), for example, implemented via conductive traces formed on the printed circuit board. For example, the memory controller 30 may control whether a data block 28 is stored in the non-volatile memory devices 32 or in the volatile memory devices 34. In other words, the memory controller 30 may transfer a data block 28 from the non-volatile memory devices 32 into the volatile memory devices 34 or vice versa.

To facilitate data transfers, the memory controller 30 may include buffer memory 38, for example, to provide temporary data storage. In some embodiments, the buffer memory 38 may include static random-access memory (SRAM) and, thus, may provide faster data access speed compared to the volatile memory devices 34 and the non-volatile memory devices 32. The buffer memory 38 may be DRAM or FeRAM in some cases. Additionally, to facilitate accessing stored data blocks 28, the memory module 24 may include an address map, for example, stored in the buffer memory 38, a non-volatile memory device 32, a volatile memory device 34, a dedicated address map memory device 26, or any combination thereof.

In addition, the remote computing device 11 may communicate with a service processor and/or a service bus included in or separate from the processing circuitry 22 and/or the data bus 25. The service processor, processing circuitry 22, and/or the memory controller 30 may perform error detection operations and/or error correction operations (ECC), and may be disposed external from the remote computing device 11 such that error detection and error correction operations may continue if power to the remote computing device 11 is lost. For simplicity of description, the functions of the service processor are described as being included in and performed by the memory controller 30, however, it should be noted that in some embodiments the error correction operations or data recovery operations may be implemented as functions performed by the service processor, processing circuitry 22, or additional processing circuitry located internal or external to the remote computing device 11 or the client device 12.

The memory module 24 is depicted in FIG. 2 as a single device that includes various components or submodules. In some examples, however, a remote computing device may include one or several discrete components equivalent to the various devices, modules, and components that make up memory module 24. For instance, a remote computing device may include non-volatile memory, volatile memory, and a controller that are positioned on one or several different chips or substrates. In other words, the features and functions of memory module 24 need not be implemented in a single module to achieve the benefits described herein.

Figure 3:
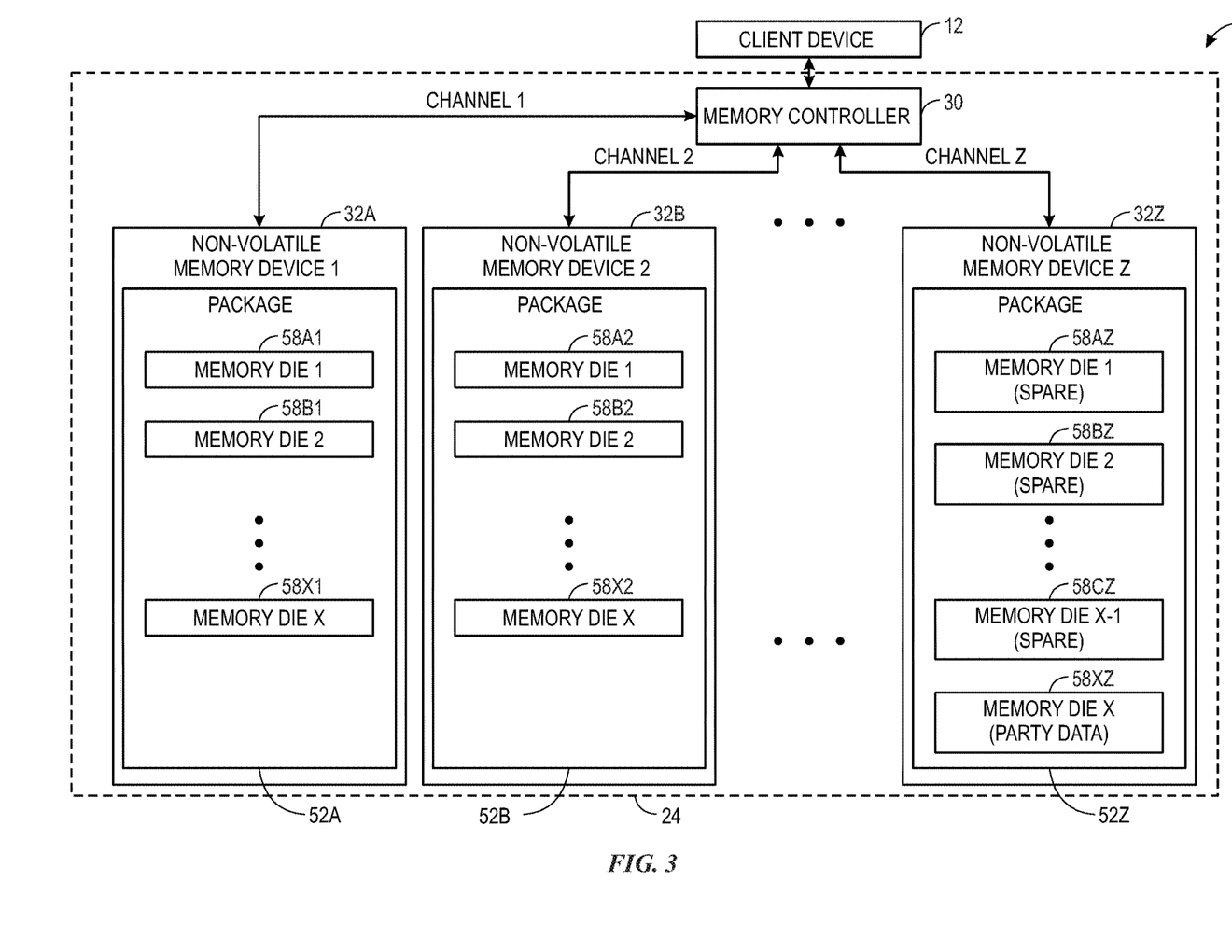
FIG. 3 is a block diagram of the memory module of FIG. 2 arranged in a non-volatile memory arrangement for providing a redundant array of independent 3D XPoint™ memory (RAIX), in accordance with an embodiment.

FIG. 3 depicts a block diagram of an example of the memory module 24 being used to provide a die-level RAIX scheme. The memory module 24 includes a Z number of non-volatile memory devices 32 each represented as storing a particular amount of data in a package 52, where the package 52 is separated into multiple memory die 58. It should be appreciated that the depicted example is merely intended to be illustrative and not limiting. In fact, in some embodiments, die-level RAIX schemes may be implemented using any number of memory die 58 per non-volatile memory device 32.

In the depicted die-level RAIX scheme, the packages 52 are generally divided into separate memory die 58. For example, memory die 58A1, 58B1, ..., 58X1 are stored on the same non-volatile memory device 32A and the same package 52A. During operation, the memory controller 30 and/or the processing circuitry 22 may operate to protect the memory module 24 data via the depicted asymmetric die-level RAIX scheme. In the die-level RAIX scheme, each memory die 58 respectively undergoes the XOR logical operation, as opposed to the whole package 52 undergoing the XOR logical operation to create the parity data. The resulting parity data is stored in the memory die 58XZ of non-volatile memory device 32Z. It should be noted that while the parity data is stored in what is depicted as the last memory die 58XZ, there is no restriction on the memory die 58 that the parity data is to be stored in. That is, for example, the parity data may be stored in a memory die 58AZ or on memory die 58A1. The remaining memory die 58 of the non-volatile memory device 32Z may be allocated as a spare memory, where the spare memory die 58AZ, 58BZ, ..., 58WZ may be used for operational overflow, additional data storage, information used by the memory controller 30 and/or processing circuitry 22 to translate logical addresses into physical address, and the like.

In general, during computing operations, the client device 12 receives inputs from users, software, or other components and, in response to the inputs, requests the memory controller 30 of the memory module 24C to facilitate performing memory operations. The client device 12 may issue these requests as commands and may indicate a logical address from where to retrieve or store the corresponding data. The client device 12, however, is unaware of the true physical address of where the corresponding data is stored since sometimes data is divided and stored in a multitude of locations referenced via one logical address. The memory controller 30 may receive these commands and translate the logical addresses into physical addresses to appropriately access stored data. To perform the translation, the memory controller 30 may use memory operation information stored in the codewords saved to each memory die 58.

Upon determining the physical address for the corresponding data, the memory controller 30 may operate to read a codeword stored in each respective memory die 58 or may operate to write a codeword in each respective memory die 58. The memory controller 30 may also parse or interpret data stored in each respective memory die 58 as part of this read/write operation to complete the requested operation from the client device 12. These operations are performed through channels communicatively coupling the non-volatile memory device 32 to the memory controller 30. These operations are performed by transmitting codewords through channels communicatively coupling the non-volatile memory device 32 to the memory controller 30.

The memory controller 30, or other suitable processing circuitry, may facilitate the updating of the parity data stored in the memory die 58. To do this, the codeword for each memory die 58 is XOR'd with the data of the subsequent memory die 58 until each respective codeword corresponding to each memory die 58 is reflected in the parity data. The memory controller 30, or the other suitable processing circuitry, may also facilitate verifying the quality of data stored in the memory die 58. In some embodiments, the memory controller 30 may perform the XOR-ing of the codewords to verify that the resulting parity data is the same. If an error is detected (e.g., the parity data is not the same and thus was determined based on defective or faulty data), this may mean a memory die 58 is physically malfunctioning, a data reading or writing error occurred beyond what error correcting code (ECC) techniques may fix, or the like. The memory controller 30 may perform these redundancy operations in response to an event or a control signal, in response to performing a reading, writing, or scrubbing operation, in response to a defined amount of time passing (e.g., for example, data in the memory die 58 is refreshed periodically, including the parity data), or any other suitable indication or event.

As described above, the depicted components of the computing system 10 may be used to perform memory operations. In some embodiments, the die-level RAIX scheme is integrated into the memory operation control flow. In other embodiments, the die-level RAIX scheme is performed in response to a particular indication, signal, event, at periodic or defined time intervals, or the like. However, in certain embodiments, the die-level RAIX scheme is performed both at certain times during memory operations and in response to a control signal. Thus, it should be understood that die-level RAIX schemes may be incorporated into memory operations in a variety of ways.

Figure 4:
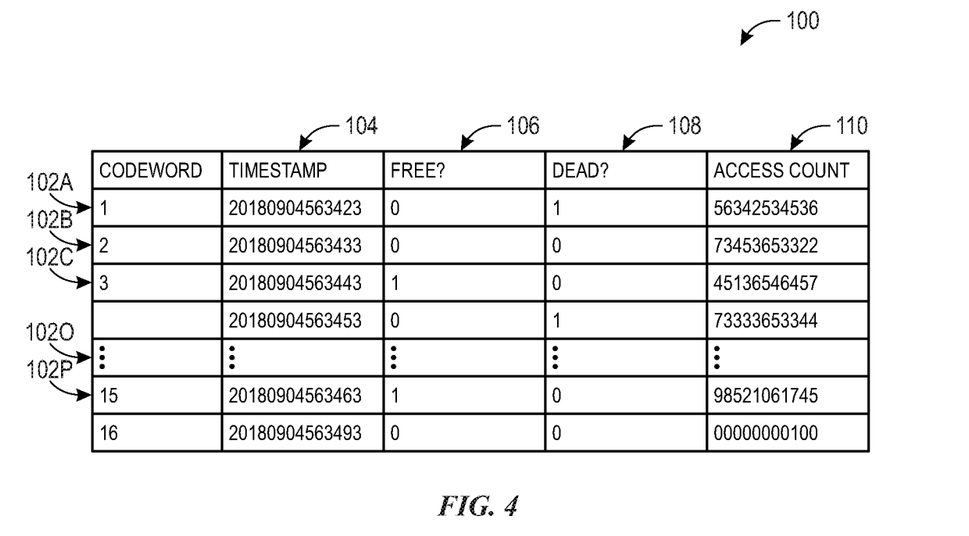
FIG. 4 is a chart of memory operation information used in monitoring performance of the memory module of FIG. 3, in accordance with an embodiment.

To help explain enhancing of codewords, FIG. 4 depicts a data table 100 maintained by the memory controller 30. The data table 100 includes separate rows 102 for each codeword. As depicted, the memory controller 30 maintains memory operation information associated with sixteen codewords, however, it should be understood that the memory controller 30 may maintain memory operation information for any number of codewords. The memory controller 30 operates to maintain an indication 104 of a timestamp corresponding to when the codeword was last accessed, an indication 106 of whether the codeword is free or is not free for use as storage (e.g., 1 corresponds to being free and 0 corresponds to not being free), an indication 108 of whether the codeword is not available for storage or is dead (e.g., 1 corresponds to being dead and 0 corresponds to not being dead), and an indication 110 of an access count associated with the particular codeword. As depicted, the codeword corresponding to row 102P has been accessed more times than the codeword corresponding to row 102A.

Figure 6:
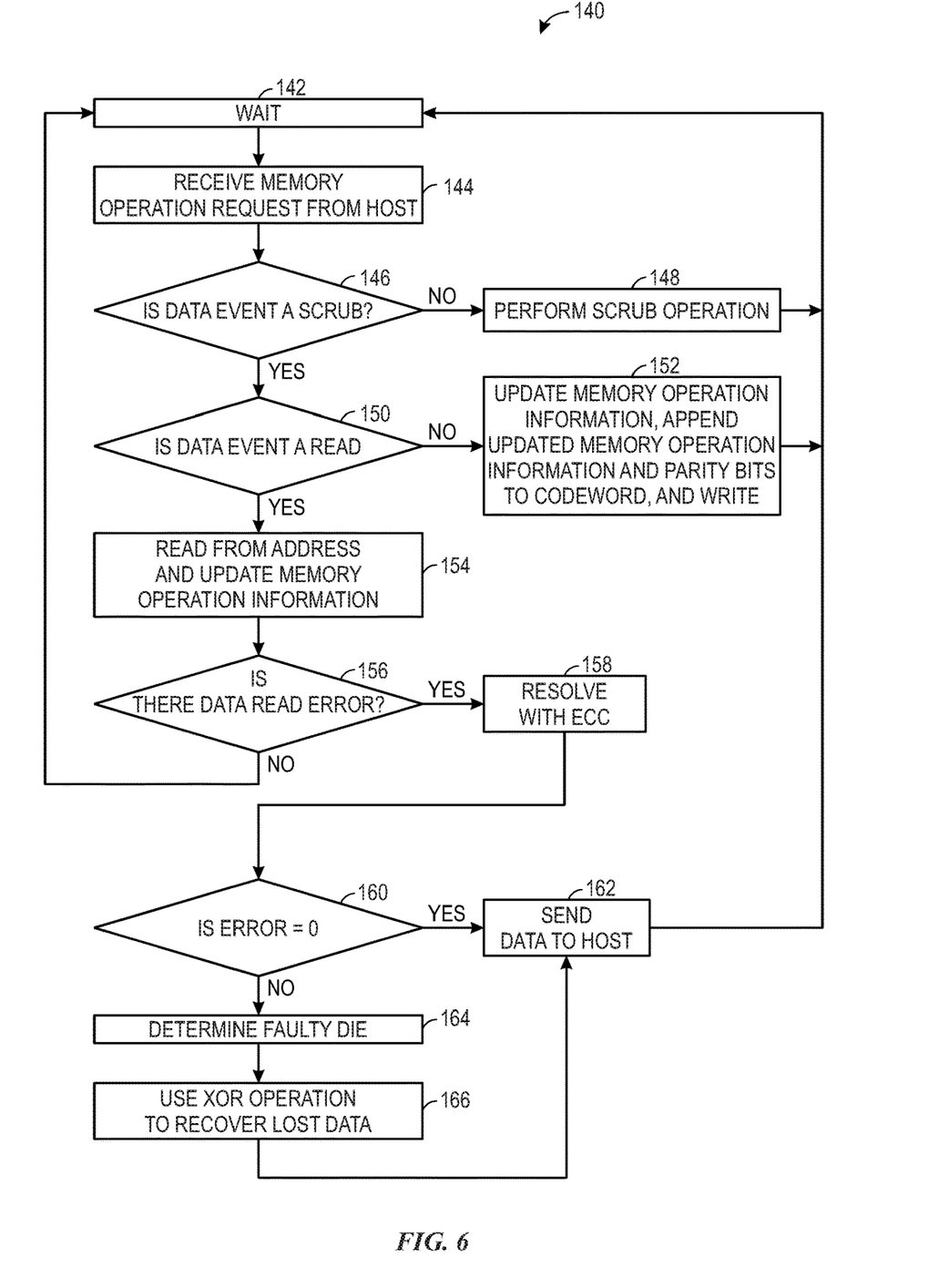
FIG. 6 is a flow diagram of a process for operating the memory module of FIG. 3 to perform die-level redundancy operations, in accordance with an embodiment.

The memory controller 30 may operate to update the memory operation information of the data table 100 after each write event, read event, and scrub event. For example, after each write event, the access count indication 110 changes, the free indication 106 changes, and the timestamp indication 104 changes for the particular codeword associated with the read event. With a scrub event, in addition to the timestamp indication 104 changing, each access count indication 110 may increment by a same increment (e.g., increase by a count of 2) since each codeword may be individually read and written during the scrub event. The memory controller 30 may maintain the various indications of the data table 100 at various points within the process 140. For example, after a data verification (e.g., at process block 154), the memory controller 30 may operate to update the dead indication 108 in response to determining that a codeword of a memory die 58 is inoperable or dead.

For generating an enhanced codeword, the memory controller 30 may operate to append or include some or all of the data of a row 102 with the data transmitted as the codeword to be stored in the memory die 58. For example, a first codeword may include a data payload or data commanded by the host to be stored in memory die 58A1 (FIG. 3) and data from row 102E of the data table 100. In this way, the storage and maintenance of a portion of the data table 100 is decentralized and spread out over each associated codeword.

Figure 5:
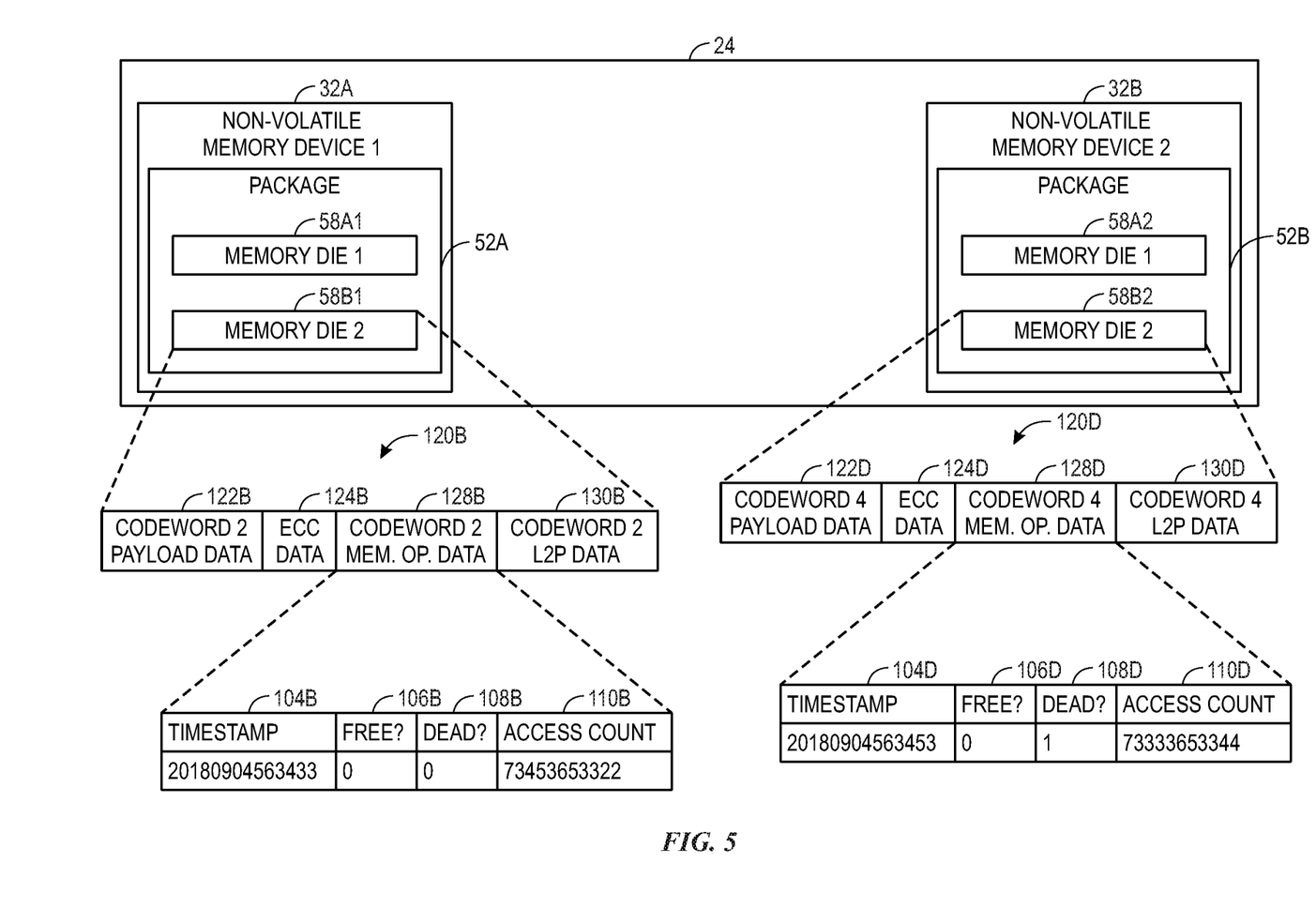
FIG. 5 is a diagrammatic representation of the memory module of FIG. 3 implementing enhanced codewords to store data of the chart of FIG. 4, in accordance with an embodiment.

To help illustrate, FIG. 5 depicts a diagrammatic representation of a portion of the memory module 24 of FIG. 3 including enhanced codewords 120 saved on each memory die 58. Each enhanced codeword 120 includes payload data 122, error correcting code (ECC) data 124, memory operation data 128, and logical-to-physical data 130. The payload data 122 represents data intended to be stored in the memory die 58 that may be specifically referenced through logical addresses. The ECC data 124 may include redundancy bits for verifying data integrity of the payload data 122 after transmission, such as a checksum, sometimes resulting from encoding performed to the payload data 122. The payload data 122 and the ECC data 124 may represent data that is included in non-enhanced codewords and enhanced codewords 120. However, the memory operation data 128 and the logical-to-physical data 130 may represent data that is included in a non-enhanced codeword to resulting in an enhanced codeword 120.

As described above, in an enhanced codeword 120, the memory operation information from the data table 100 is included in each enhanced codeword 120 as the codeword memory operation data 128. By including the codeword memory operation data 128 with the enhanced codeword 120, the memory controller 30 may preserve information related to the memory module 24 that, if lost, may render the memory module 24 wholly or partially in operable. In this way, each time an enhanced codeword 120 is written to a memory die 58, the memory operation information is updated and backed-up through the parity data.

Comparing the enhanced codeword 120D to the data table 100 row 102D, it is clear that the data from the data table 100 is included in the enhanced codeword 120D. In this way, each memory die 58 used to store data during the memory operations may implement an enhanced codeword 120 structure. As shown, the memory die 58B1 also includes an enhanced codeword 120B having data from data table 100.

Including an enhanced codeword 120 may improve memory technology because the additional data may facilitate decreasing the amount of protective capacitors used to back-up memory operation information. By storing some memory operation information in the respective codewords, less information (e.g., data) is centrally maintained by the memory controller 30 in a common data table, like the data table 100, that is to be backed-up in response to a data loss event, and thus fewer protective capacitors may be used to facilitate memory persistence. This occurs because the protective capacitors temporarily provide enough power for a suitable time period to permit transmitting critical data into non-volatile memory in the event of an asynchronous power loss event. Thus, having less data to move into non-volatile memory in the event of an asynchronous power loss event may translate into a reduction of an amount of protective capacitors and a reduction in an overall length of capacitor discharge time used to protect the critical data.

To help illustrate, FIG. 6 depicts an example of a process 140 for controlling memory operations and die-level RAIX back-up schemes of a memory module 24. Generally, the process 140 includes the memory controller 30 waiting for a memory operation request from the host (e.g., processing circuitry 22 and/or client device 12) (process block 142), receiving a memory operation request from the host (process block 144), and determining if the memory operation request corresponds to a scrub event (decision block 146). In response to the memory operation request corresponding to a scrub event, the memory controller 30 continues to perform the scrub operation (process block 148), however in response to the memory operation request not corresponding to a scrub event, the memory controller 30 determines if the memory operation request corresponds to a data read event (decision block 150). In response to the memory operation request not corresponding to a data read event, the memory controller 30 may update the parity data, append the parity data to a segment of data for writing, and write the segment of data (process block 152), where after completion of the writing, the memory controller 30 may wait for additional memory operation requests from the host (process block 142). However, in response to the memory operation request corresponding to a data read event, the memory controller 30 may read a segment of data from a corresponding memory address (process block 154) and determine if a data error occurred (decision block 156). In response to determining that a data error did not occur, the memory controller 30 may wait for additional memory operation requests from the host (process block 142), however, in response to determining that a data error did occur, the memory controller 30 may attempt to resolve the error using error correction code (ECC) techniques (process block 158), and determine whether the data error is eliminated (decision block 160). In response to determining that the data error is eliminated, the memory controller 30 may send the read data to the host (process block 162), and proceed to wait for additional memory operation requests from the host (process block 142). However, in response to determining that the resolved error is not zero, the memory controller 30 may determine the faulty memory die 58 (process block 164), use an XOR logical operation to recover lost data based on the faulty memory die 58 (process block 166), send the recovered data to the host (process bock 162), and proceed to wait for an additional memory operation request from the host (process block 142).

In any case, as described above, a memory controller 30 may wait for a memory operation request from its host device (process block 142). In this way, the memory controller 30 may be idle, and not performing memory operations (e.g., read, write) in-between read or write access events initiated by the host device.

The memory controller 30 may receive a memory operation request from the host (process block 144) and may perform memory operations in response to the received memory operation request (e.g., data read event, data write event, data scrub event). In some embodiments, the memory operation request may identify the requested data block 28 or segment of data by a corresponding logical address. As described above, when identified by the logical address, a memory controller 30 may convert the logical address into a physical address. This physical address indicates where the data is actually stored in the memory module 24. For example, the memory controller 30 may use an address map, a look-up table, an equation conversion, or any suitable method to convert the logical address to a physical address. The processing circuitry 22 receives the various memory operation requests via communication with the client device 12, however in some embodiments, the processing circuitry 22 may initiate various memory operation requests independent of the client device 12. These memory operation requests may include requests to retrieve, or read, data from one or more of the non-volatile memory devices 32 or requests to store, or write, data into one or more of the non-volatile memory devices 32. In this way, during memory operations, the memory controller 30 may receive a logical address from the host, may translate the logical address into a physical address indicative of where the corresponding data is to be stored (e.g., writing operations) or is stored (e.g., reading operations), and may operate to read or write the corresponding data based on a corresponding physical address.

In response to the memory operation request, the memory controller 30 may determine if the memory operation request corresponds to a data scrub event (decision block 146) to initiate memory scrubbing operations. As described above, certain types of memory may be periodically read and rewritten to refresh electrical signals indicating the data bits stored in the memory die as codewords. For example, phase change memory or 3D XPoint™ memory may be periodically scrubbed (e.g., read and rewritten) to help preserve electrical signals stored as data bits. These types of memory discharge electrical signals overtime, which may lessen data integrity if not periodically refreshed or scrubbed. Thus, the memory controller 30 may operate to scrub certain types of memory die 58 in response to receiving a memory scrub request from the processing circuitry 22 or from other suitable circuitry, such as from a timer managing periodic intervals between scrub events. If the memory controller 30 determines the memory operation request corresponds to a data scrub event, the memory controller 30 may perform memory scrubbing operations (process block 148) and, at the conclusion of memory scrubbing operations, may continue on to wait for additional memory operation requests from the host (process block 142).

However, in response to determining that the memory operation request does not correspond to a data scrub event, the memory controller 30 may determine if the memory operation request corresponds to a data read event (decision block 150). The memory controller 30 may check for changes to data stored in the non-volatile memory devices 32 and/or may operate by assuming data stored in the non-volatile memory devices 32 changes after each data write. Thus, the memory controller 30 generally determines whether a data write event occurred, where the data write event changes data of a codeword stored in any one of the memory die 58. This determination is performed to facilitate keeping parity data stored in the memory die 58 relevant and/or accurate.

If the memory operation request corresponds to a data write event (e.g., is not a data read event), the memory controller 30 may append updated memory operation information and parity bits to the codeword to be written and may write the segment of data to memory (process block 152). These parity bits may be used in future error correcting code operations to resolve minor transmission errors (e.g., at process block 158). The memory controller 30 may also update memory operation information stored within the enhanced codeword 120. Similar to process block 156, the memory controller 30 may update the memory operation information stored within the data table 100 and append the updated data to the enhanced codeword 120, or may directly update the memory operation information already within the enhanced codeword 120 for storage. Using the enhanced codeword 120D as an example, in response to the write event, the memory controller 30 may update the access count indication 110D by incrementing the value by a predetermined value (e.g., one) and may update the timestamp indication 104D to reflect a time of access (e.g., a time of writing). In some embodiments, the timestamp indication 104D is updated to reflect a time a predetermined amount in the future corresponding to the time taken by the memory controller 30 to actually store the enhanced codeword 120 into the memory die 58 (e.g., a predicted time of writing).

In addition, the memory controller 30 may update the parity data to reflect the changed codeword. The memory controller 30 of the memory module 24 may perform the XOR logical operation to each of the memory die 58 and may store the XOR result as the updated parity data into a parity data memory die 58 (e.g., memory die 58XZ). In some embodiments, the memory controller 30 may include data stored in spare memory in the XOR logical operation, such that the XOR result represents the XOR of each memory die 58 and data stored in the spare memory. It should be noted that, in some embodiments, the memory controller 30 updates the parity data in response to receiving an indication created in response to a timer tracking minimum parity data update intervals or an indication transmitted from the client device 12 to request the update of the parity data. In these embodiments, it may be desirable for the memory controller 30 to update the parity data more frequently than just in response to data write operations and, thus, by the memory controller 30 determining if the memory operation request corresponds to a data read event, the memory controller 30 may update the parity data in response to each memory operation request except for those which correspond to a data read event including, for example, requests based on tracked time intervals. Upon appending and writing the codeword to memory, the memory controller 30 may wait to receive an additional memory operation request from the host (process block 142).

However, in response to determining the memory operation request corresponds to a data read event, the memory controller 30 may read a segment of data at a corresponding memory address and update the memory operation information (decision block 154). The memory operation request includes a logical address at which a desired segment of memory is stored. The memory controller 30 may retrieve the desired segment of memory at the indicated logical address in response to the memory operation request (e.g., through referencing a converted physical address and operating to retrieve the segment of data from the corresponding memory die 58). The memory controller 30 may operate to update the memory operation information in a variety of ways, including directly incrementing, changing, or decrementing the data stored as memory operation information. Using the enhanced codeword 120B as an example, the memory controller 30 may increment the access indication 110B by a predetermined amount (e.g., one) and may update the timestamp indication 104B to reflect a time of access (e.g., a time of reading).

After reading the segment of data, the memory controller 30 may determine if the data is correct (e.g., not defective) (decision block 156). The memory controller 30 may perform various data verification techniques to confirm the data is correct by verifying the read enhanced codeword 120 is the same way as was initially represented with the parity data stored on memory die 58. These data verification techniques may facilitate the detection of both physical and digital defects associated with the memory module 24. These defects may include issues such as data writing errors, mechanical defects associated with the physical memory die 58, mechanical defects associated with the non-volatile memory device 32, and the like. To verify the data, for example, the memory controller 30 may proceed to use XOR verification to determine if the enhanced codeword 120 read in response to the data read event is uncorrupted and correct. To do this, the memory controller 30 of the memory module 24 may XOR enhanced codewords 120 of each memory die 58, and in some embodiments the data of each memory die 58 and the spare memory, to determine an additional XOR result. Upon calculating the additional XOR result, the memory controller 30 may determine if the XOR results are the same. The memory controller 30 of the memory module 24 may compare the additional XOR result and the parity data stored in memory die 58 to determine if the XOR results are equal or substantially similar (e.g., within a threshold of similarity such that the results are considered equal).

In response to determining if the XOR results are the same and thus the read data is correct (e.g., found no data error), the memory controller 30 may proceed to wait for an additional memory operation request from the host (process block 142). However, in response to determining that the XOR results are not the same and thus the read data is incorrect (e.g., found data error), the memory controller 30 may attempt to resolve the data error with error correcting code (ECC) techniques (process block 158). Error correcting code techniques may include adding redundant parity data to a segment of data such that, after reading, the original segment of data may still be recovered even if minor data corruption occurs. There are a wide variety of valid ways to perform this preliminary quality control step to verify that the data error is not caused by a minor transmission issue, such as convolutional codes and block codes methods.

After attempting to resolve the data error with error correcting code techniques, the memory controller 30 may determine if the data error has been eliminated from the correction (decision block 160). If the memory controller 30 determines the error equals zero after implementing the error correcting code techniques, the memory controller 30 may send the read data to the host device for further processing and/or use in computing activities. After transmission of the read data, the memory controller 30 waits for an additional memory operation request from the host (process block 144).

However, if the memory controller 30 determines the data error is not eliminated (e.g., error does not equal zero), the memory controller 30 may proceed to determine which of the memory die 58 is defective or faulty (process block 164). The memory controller 30 may perform various determination activities to determine which memory die 58 is faulty, such as systematic testing of the memory die 58 responses to test write or read operations. Furthermore, in some embodiments, the memory controller 30 may communicate the data error to the client device 12 and receive an indication from the host, such as an indication originating from a user of the client device 12, communicating which memory die 58 is defective or faulty.

When the memory controller 30 determines which memory die 58 is faulty, the memory controller 30 may use the parity data to recover the data lost in response to the faulty memory die 58 (process block 166). The memory controller 30 may recover the lost data by performing an inverse of the XOR logical operation. That is, the memory controller 30 may XOR each of the memory die 58 without XOR-ing the faulty memory die 58 data and with including the parity data. Assuming, for example, that a memory die 58A2 is faulty—the memory controller 30 XORs all of the memory die 58 to determine the lost data of memory die 58C without XOR-ing the data of the faulty memory die 58A2 and substituting the data of the memory die 58A2 with the parity data to recreate the lost data of the memory die 58A2 (e.g., the data of memory die 58A1 XOR'd with the data of memory die 58B2 XOR'd with the parity data of memory die 58 to determine lost data of the memory die 58A2). Furthermore, in some embodiments, the memory controller 30 performs this recovery operation in response to receiving a proceed indication from the processing circuitry 22, or other suitable processing circuitry. In this way, in these embodiments, the memory controller 30 may wait to recover the lost data until a physical repair is performed.

Upon recovering the lost data, the memory controller 30 may transmit the recovered data to the host (process block 162) and proceed to wait for an additional memory operation request (process block 142). The memory controller 30 may continue the process 140 to keep the parity data up to date, to monitor data quality stored within the non-volatile memory devices 32, and/or to perform recovery operations in the event of data loss.

Figure 7:
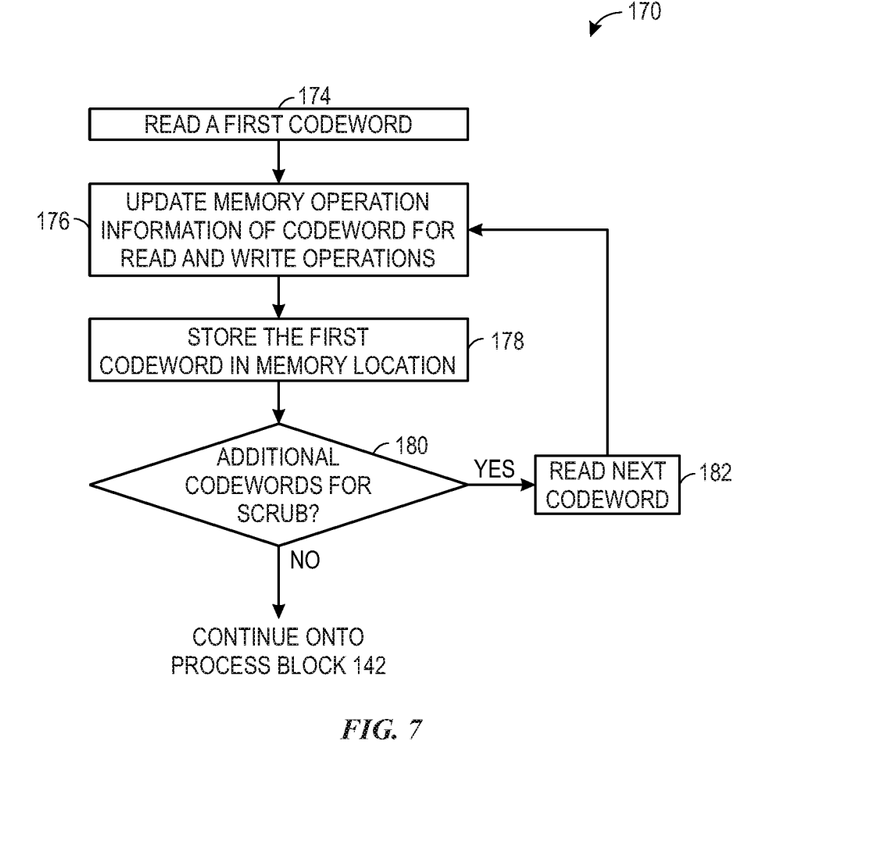
FIG. 7 is a flow diagram of a process for operating the memory module of FIG. 3 to update an enhanced codeword of FIG. 5 in response to a scrub request, in accordance with an embodiment.

As described above with respect to process block 148, a memory controller 30 may use differing memory operations to maintain, access, or generally interact with data stored within different types of memory die 58, for example, memory scrubbing operations. FIG. 7 depicts an example of a process 170 for updating the enhanced codeword 120 in response to the memory controller 30 receiving a memory operation request corresponding to a data scrub event. The process 170 may be followed by the memory controller 30 at process block 148 of the process 140 to perform a scrub operation. Generally, the process 170 includes the memory controller 30 reading a first enhanced codeword 120 (process block 174), updating memory operation information of the first enhanced codeword 120 for both read and write operations (process block 176), storing the first enhanced codeword 120 in a memory die 58 (process block 178), determining whether there is an additional codeword to scrub (decision block 180), and either continuing the process 170 by, if there is an additional codeword, reading a next enhanced codeword 120 (process block 182) or, if there is not an additional codeword, continuing with memory operations from process block 144 of the process 140.

As described above, the memory controller 30, while performing the process 140, may receive a memory operation request corresponding to a data scrub event from the processing circuitry 22 to initiate memory scrubbing operations (process block 144 and process block 146). The processing circuitry 22 may use a data scrub event to communicate to the memory controller 30 to begin memory scrubbing operations. Certain types of memory may be periodically read and rewritten to refresh electrical signals indicating the data bits stored in the memory. For example, phase change memory or 3D XPoint™ memory may be periodically scrubbed (e.g., read and rewritten) to help preserve electrical signals stored as data bits. These types of memory may discharge electrical signals overtime, which may lessen data integrity if not periodically refreshed or scrubbed. Thus, the memory controller 30 may operate to scrub certain types of memory die 58 in response to receiving a memory scrub request from the processing circuitry 22 or from other suitable circuitry, such as from a timer managing periodic intervals between scrub events.

After receiving the data scrub event, the memory controller 30 may read a first enhanced codeword 120 from a memory die 58 (process block 174). The memory controller 30 may transform physical electrical signals into logical bits for transmission to the processing circuitry 22 as part of the reading operation. To read, the memory controller 30 may retrieve an entire enhanced codeword 120 from the memory die 58 for transmission to processing circuitry 22. In some embodiments, the read enhanced codeword 120 may be temporarily stored, such as in volatile memory associated with the memory controller 30, while the process 170 continues.

After reading the first enhanced codeword 120, the memory controller 30 may update memory operation information of the first enhanced codeword 120 for both read and write operations performed during the scrub event (process block 176). The memory controller 30 may increment values for the access count indication 110 in response to the read operation of process block 174 and in anticipation of the write operation of process block 178. Thus, the access count indication 110 may increase by twice as much during the scrub event as the access count indication 110 value increases during the reading or writing. The timestamp indication 104 may be updated to reflect a time of access (e.g., a time of reading or writing) or a predicted time of writing.

After updating the memory operation information of the first enhanced codeword 120, the memory controller 30 may store the first enhanced codeword 120 back into a memory die 58 (process block 178). Each enhanced codeword 120 may correspond to a memory die 58 such that a read enhanced codeword 120 is written to the same memory die 58 or a different memory die 58. The memory controller 30 may transmit the first enhanced codeword 120 through a channel corresponding to its memory die 58. As an example, the enhanced codeword 120B is stored in memory die 58B1 and the memory controller 30 may not store the enhanced codeword 120B into the memory die 58B2 during memory operations. The memory controller 30 stores data corresponding to the original payload and the updated memory operation information of the enhanced codeword 120 during the scrub event.

Upon storing the enhanced codeword 120 into the memory die 58, the memory controller 30 may determine if an additional enhanced codeword 120 is to be scrubbed (decision block 180). The memory controller 30 may perform this determination in a variety of ways, for example, maintaining a counter and an indication of an expected number of enhanced codewords 120 to scrub. This check enables the memory controller 30 to determine if the memory scrubbing operations are complete (e.g., if each memory die 58 has been refreshed).

If the memory controller 30 determines that there is an additional enhanced codeword 120 to be scrubbed, the memory controller 30 may read the additional enhanced codeword 120 (e.g., the next enhanced codeword 120). The memory controller 30 may read the additional enhanced codeword 120 in a similar manner as in the first enhanced codeword 120 was read at process block 174. After reading the additional enhanced codeword 120, the memory controller 30 continues the process 170 at process block 176 to update memory operation information of the additional enhanced codeword 120.

If the memory controller 30 determines that there is not an additional enhanced codeword 120 to be scrubbed, the memory controller 30 may continue the process 170 to determine whether a data write or a data change event occurred (process block 144). Since a data write event occurred at process block 178, the memory controller 30 operates to back-up the new data stored in a corresponding memory die 58 to the enhanced codeword 120.

During memory scrubbing operations, an enhanced codeword 120 that has been read from a memory die 58 but not yet written back into the memory die 58 (e.g., between process blocks 174 and 178) is considered inflight data. If an asynchronous power loss event occurs while data is inflight, the memory controller 30 may redirect the inflight enhanced codeword 120 into a spare memory die 58 to preserve the data without compromising (e.g., interrupting) memory scrubbing operations. Furthermore, in some embodiments, the memory controller 30 may store common data from volatile memory, such as a data table similar to the data table 100, into a spare memory die 58. These operations that occur in response to the asynchronous power loss event may occur while one or more protective capacitors discharge—thus, having less data to store in response to asynchronous power loss events, and therefore permitting faster back-up operations in these unanticipated power loss situations, may improve memory and memory redundancy technology.

In some embodiments, the memory scrub request may be generated by the processing circuitry 22 or other suitable circuitry in response to device operating conditions. These device operating conditions may include operating temperature, a measured temperature (e.g., of a component of interest, for example, a component particularly sensitive to temperate changes), a utilization amount, an amount of operating cycles, or the like.

Also, in some embodiments, the processing circuitry 22 and/or the client device 12 may interpret and/or process the memory operation data 128 associated with the enhanced codeword 120. As described above, information associated with the memory operation data 128, such as the access count indication 110, may be correlated or otherwise analyzed to determine memory module 24, non-volatile memory device 32, package 52, or memory die 58 health. The processing circuitry 22 and/or the client device 12 may also reference the memory operation data 128 to predict a lifespan, a duration of functionality, or any other suitable data analytics process associated with each of the listed memory components.

In addition, in some embodiments, a memory controller 30 may perform various backup operations in response to a memory change event, such as in response to determining that a codeword stored in a particular memory die 58 changed during memory operations. In this way, memory operation requests may cause a change to a codeword 120 stored in a memory die 58 and, in response to identifying the change, the memory controller 30 may initiate or preform an action. Thus, the memory controller 30 may determine that a codeword 120 changed to begin updating parity data instead of (or in addition to) interpreting a memory operation request to determine if parity data is to be updated.

Thus, technical effects of the present disclosure include facilitating improved redundancy operations to protect against data loss of memory operation information. These techniques describe systems and methods for enhancing codewords stored on memory die to include memory operation information, creating parity data that backs up the memory operation information in addition to payload data, and recovering data which includes the memory operation information in the event of data loss, all at the die-level. This disclosure also describes that a host device may use the memory operation information in monitoring health and/or performance of the memory module, since, for example, an access count associated with a memory die may correspond to an overall lifespan predictor for the memory die and may be correlated to health of the memory die.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An apparatus, comprising:
a printed circuit board;
a plurality of memory devices each disposed on a planar surface of the printed circuit board, wherein each memory device of the plurality of memory devices comprises two or more memory die;
a plurality of channels communicatively coupled to each memory device, wherein each channel of the plurality of channels is associated with one of the two or more memory die of each memory device; and
a memory controller communicatively coupled to the plurality of channels, wherein the memory controller is configured to maintain a redundancy scheme via data transmission through the plurality of channels, wherein the memory controller is configured to write parity data in a first memory die of a respective two or more memory die, wherein the memory controller is configured to generate the parity data based at least in part on each respective codeword associated with each memory die of each memory device, and wherein the memory controller is configured to update and append memory operation information to each codeword in response to each memory operation request.

2. The apparatus of claim 1, wherein each respective codeword comprises:
payload data; and
data indicative of memory operation that has involved the payload data.

3. The apparatus of claim 1, wherein the parity data comprises an indication of values stored within each of the two or more memory die.

4. The apparatus of claim 1, wherein the memory operation request comprises at least one of a memory write operation, a memory scrubbing operation, or an indication generated in response to a time period passing, or any combination thereof.

5. The apparatus of claim 1, wherein the memory controller is configured to generate the parity data based at least in part on memory operation data transmitted on one of the channels associated with one of the two or more memory die.

6. The apparatus of claim 1, wherein the memory controller is configured to write the parity data to one of the two or more memory die.

7. The apparatus of claim 1, wherein each memory die of the two or more memory die comprises at least one of flash memory, NAND memory, phase-change memory, 3D XPoint™ memory, or ferroelectric random access memory, or any combination thereof.

8. The apparatus of claim 1, wherein the memory controller is configured to use a die-level exclusive-or (XOR) logical operation to generate the parity data as representative of data stored in each memory device of the plurality of memory devices.

9. The apparatus of claim 8, wherein the memory controller is configured to:
determine that a first memory die of the two or more memory die comprises defective data associated with a data loss event;
XOR the parity data with a subset of the two or more memory die that excludes the first memory die to generate an XOR result; and
transmit the XOR result as recreated data corresponding to the first memory die, wherein the recreated data is equal to data stored in the first memory die before the data loss event.

10. A method, comprising:
identifying a change to a codeword stored in a first memory die of a memory device on a module that comprises a plurality of multi-die packaged memory devices, wherein the codeword includes most recent time of access data and access count data associated with the first memory die;
generating, in response to the identified change to the codeword, an exclusive-or (XOR) result using an XOR logic operation on the codeword;
writing the XOR result as parity data to a second memory die of the memory device;
determining that the first memory die of the memory device experienced a data error; and
restoring the codeword using an inverse of the XOR logic operation on the parity data from the second memory die of the memory device.

11. The method of claim 10, comprising:
identifying at least one of a data read event, a data write event, or a data scrub event, wherein the change to the codeword is based at least in part on the data read event, the data write event, the data scrub event, or any combination thereof.

12. The method of claim 10, wherein performing the XOR logical operation comprises XOR-ing the codeword and one or more additional codewords associated with the plurality of multi-die packaged memory devices with each other such that each of the additional codewords undergoes the XOR-ing once to create the XOR result.

13. The method of claim 10, wherein the first memory die comprises phase-change memory, 3D XPoint™ memory, or any combination thereof.

14. The method of claim 10, wherein the codeword comprises:
payload data; and
data indicative of a logical-to-physical address translation.

15. The method of claim 10, wherein the XOR logical operation comprises XOR-ing the codeword of the first memory die with an additional codeword stored in a third memory die associated with a different memory device of the plurality of multi-die packaged memory devices.

16. A memory module, comprising:
a plurality of memory devices comprising a first subset of memory die and a second subset of memory die, wherein each memory die of the first subset of memory die is configured to store a respective codeword of a plurality of enhanced codewords;
a plurality of channels communicatively coupled to each memory device of the plurality of memory devices, wherein each channel of the plurality of channels is associated with a respective memory die of the first and second subset of memory die; and
a memory controller communicatively coupled to each the plurality of channels, wherein the memory controller is configured to:
update memory operation information of the respective codeword to be stored on a respective memory die of the first subset of memory die;
determine parity data based at least in part on the updated memory operation information of the respective codeword and based on data of the respective codeword;
store the parity data in the second subset of memory die;
determine that a data loss event occurred; and
recreate lost memory operation information from the data loss event using the parity data and data stored in the first subset of memory die based at least in part on determining that the data loss event occurred.

17. The memory module of claim 16, wherein the memory controller is configured to recreate lost data associated with a respective die of the first subset of memory die via a logical operation to exclusive-or (XOR) the data stored in the first subset of memory die with the parity data.

18. The memory module of claim 16, wherein the plurality of enhanced codewords each respectively comprise:
payload data specific to a respective memory die; and
memory operation data configured to indicate a most recent time of access data and access count data corresponding to the respective memory die.

19. The memory module of claim 16, wherein each memory die of the first subset of memory die and of the second subset of memory die comprises a 3D XPoint™ memory.

20. The memory module of claim 16, wherein the memory controller is configured to:
- receive a memory operation request from a host;
- perform memory scrubbing operations based at least in part on the memory operation request comprising a data scrub event; and
- adjust the memory operation information of the respective codeword by a predetermined amount equal to a sum of an access count associated with a data read event and an access count associated with a data write event.

* * * * *